United States Patent
Mustonen

(10) Patent No.: US 7,822,580 B2
(45) Date of Patent: Oct. 26, 2010

(54) METHOD AND A SYSTEM FOR MONITORING THE CONDITION AND OPERATION OF PERIODICALLY MOVING OBJECTS

(75) Inventor: Harri Mustonen, Jyvaskyla (FI)

(73) Assignee: Metso Automation OY, Helsinki (FI)

( * ) Notice: Subject to any disclaimer, the term of this patent is extended or adjusted under 35 U.S.C. 154(b) by 83 days.

(21) Appl. No.: 12/225,867

(22) PCT Filed: Apr. 3, 2007

(86) PCT No.: PCT/FI2007/050187

§ 371 (c)(1),
(2), (4) Date: Oct. 1, 2008

(87) PCT Pub. No.: WO2007/118931

PCT Pub. Date: Oct. 25, 2007

(65) Prior Publication Data

US 2009/0139334 A1    Jun. 4, 2009

(30) Foreign Application Priority Data

Apr. 3, 2006    (FI)    ................................ 20065217

(51) Int. Cl.
*H04B 15/00* (2006.01)

(52) U.S. Cl. ........................... 702/199; 702/34; 702/56; 702/79; 702/176; 702/190; 73/570; 73/598

(58) Field of Classification Search ................... 73/570, 73/598; 702/34, 35, 56, 79, 176, 190, 199
See application file for complete search history.

(56) References Cited

U.S. PATENT DOCUMENTS

| 6,526,356 B1 * | 2/2003 | DiMaggio et al. ............. 702/35 |
| 6,789,025 B2 | 9/2004 | Boerhout |
| 7,099,782 B2 * | 8/2006 | Hitchcock et al. ............. 702/56 |

FOREIGN PATENT DOCUMENTS

| FI | 91919 B | 5/1994 |
| JP | A-57-191520 | 11/1982 |
| WO | WO 96/05486 | 2/1996 |

* cited by examiner

*Primary Examiner*—Mohamed Charioui
*Assistant Examiner*—Elias Desta
(74) *Attorney, Agent, or Firm*—Oliff & Berridge, PLC

(57) ABSTRACT

A system and method for monitoring a condition and an operation of a periodically moving object is provided. Herein a synchronized time average is calculated for a measurement signal, the signal containing periodical variations and obtained from the object response. In general, a frequency response is determined based on the periodical variations of the measurement signal. A signal component representing the determined frequency response is filtered from the measurement signal. The filtered signal is used as a synchronizing signal. A synchronized time average of sequences, determined by dividing the measurement signal by the synchronizing signal, is calculated.

19 Claims, 8 Drawing Sheets

METHOD AND A SYSTEM FOR MONITORING THE CONDITION AND OPERATION OF PERIODICALLY MOVING OBJECTS

FIELD OF THE INVENTION

The invention relates to a method according to the preamble of the appended claim 1 for monitoring the condition and operation of periodically moving objects. The invention relates to a system according to the preamble of the appended claim 10 for monitoring the condition and operation of periodically moving objects.

BACKGROUND OF THE INVENTION

An analysis technique, so-called Synchronous Time Average (STA) method is commonly used in the process of monitoring the condition and operation of rotating objects. These are typically rotating shafts of various machines, or other rotating parts, such as cogged wheels of a gearbox, or turbine rotors, as well as different kinds of objects running in devices. Objects to be monitored include for example rolls, pumps, blowers, screens, grinders, barking drums and mixers as well as wires and felts in the manufacturing process of paper and pulp. All the above-mentioned objects move periodically. Typically the objects are subjected to friction causing wearing and faults that can break the machine or the object that is being monitored. Vibration sensors attached to the object being monitored are typically used for the measurements, said sensors measuring the vibration as acceleration, speed, or displacement. Pressure sensors are also used in monitoring pumps, screens and hydraulics, said pressure sensors being used for measuring pressure pulsations occurring in pipeworks.

In the STA method the signal to be measured is divided into time periods corresponding the rotating cycles, said time periods being averaged with respect to each other. The averaged periods are typically determined from a synchronizing signal obtained by measuring the rotating frequency of the object by means of a separate synchronizing sensor. It is, for example, possible to install a magnet on the periphery of the rotating axis of the rotating object, wherein the magnetic synchronizing sensor gives one pulse per cycle, when the magnet passes by said sensor. The essential aspect in the STA method is that the synchronizing pulse is always obtained from the same point of the rotating cycle. Thus, all such variations, which in the actual measurement signal occur at the rotating frequency or its multiple, are of the same phase in each sample to be averaged. Correspondingly, the phase of the signal components occurring at other frequencies varies from one sample to another. In the averaging process the signal components whose phase is the same in all samples, remain in the average value. The components whose phase is not synchronized with the rotating frequency disappear, because their phase varies from one sample to another in the averaging process. Thus, the STA method is also one kind of a noise removal method, by means of which it is possible to remove all such frequency components from the measurement signal, which are not synchronized with the rotation and the rotating frequency of the rotating object to be measured. If there are periodical variations caused by several different objects, it is possible to use the STA method to distinguish the variation caused by each rotating object separately. Furthermore, the noise-type random variations or measurement noise summing to the measurement signal can be eliminated by means of the STA method.

FIGS. 1a to 1d illustrate the application of the STA method when measuring damage on the surface of a rotating roll. In the example of FIG. 1a it is determined to which extent a press roll 1 causes vibrations that are produced for example by a shape error 3 in the press roll. The roll 2 also contains shape errors 4, but the aim is to filter off their effect and the vibration caused by the measurement, as well as vibrations of other sources. The vibrations are periodical variations, because they are repeated at regular intervals that depend on the speed of rotation. The filtering takes place by averaging several measurements, each of them being started at the same point (origin of the time axis) at the rotation of the roll 1. Each measurement is started by a synchronizing pulse or signal 9 obtained from a sensor 7 that is for example a magnetic sensor or an optical sensor, depending on the object to be measured. The sensor 7 detects a magnet 5 passing by, said magnet being attached for example on the shaft of the roll 1.

The first measurement is shown in FIG. 1a, in which a vibration 11 illustrates a change caused by a shape error 3 in the signal given by the acceleration sensor 6. The acceleration sensor 6 is attached to the bearing housing of the roll 1 that is being analysed. The information of the sensors is transferred to the analysing apparatus 10. The analysing apparatus 10 collects information, analyses it and performs the necessary calculation and reporting. It is typically a computer in which the measurement data is entered.

A second measurement is shown in FIG. 1b, which illustrates the fact that the vibration 11 does not shift on the time axis, but the vibration 12 caused by the shape error 4 of the roll, has, in turn, shifted on the time axis. This results from the fact that the diameters of the rolls deviate from each other and each measurement begins at the moment where the position of the shape error 4 varies. However, the sensor 5 and the shape error 3 are always in the same position during the measurement.

A third measurement is shown in FIG. 1c, and the vibration 12 has again changed its position on the time axis. The vibration 11 synchronized with the roll 1, is precisely in the same location in each measurement. There are for example several hundreds of measuring cycles, corresponding to the hundreds of revolutions of the roll 1. When the results of all the measurements are summed up and divided with the number of measurements, a synchronized time averaged signal shown in FIG. 1d is obtained as a result. However, vibration not synchronized with the roll 1 approaches zero. The larger the number of average values obtained, the closer to zero the portion of the unsynchronized vibration comes, and this results in an improved signal-to-noise ratio for the part of the averaged signal. As noise it is possible to consider all the parts of the signal that are not synchronized with the triggering target, for example the roll 1.

In order to be able to function, the above-described method requires a separate synchronizing signal by means of which the rotating frequency and phase are monitored, and in order to apply the method, it is necessary to install a separate synchronizing sensor for the object to be monitored. This is naturally an expense that can be eliminated, if the averaging can be made without a separate synchronizing signal. Often there occurs a situation that the information on the speed of rotation of the object can be obtained for example from the control system of electric drives that measures speed by means of a tachometer. Even if a separate synchronizing signal would not be obtained from the tachometer, it is possible that the analysis can be carried out on the basis of the information on the speed of rotation only. Thus the measurement signal to be averaged is divided into sequences whose length corresponds to the time of the rotating cycle calculated by means of the speed of rotation. In an ideal case, the exact same result is obtained in this manner than when using a separate synchronizing signal. If the object rotates at constant speed, one pulse per revolution is obtained from the synchronizing sensor in such a manner that the pulse interval remains constant. Correspondingly, the same pulse interval can be calculated without the synchronizing sensor, if absolutely correct information on the rotating frequency is available. The only information lost when the pulse sensor is not taken in use is the absolute phase information, in other words the starting point of the sequences to be averaged is positioned in a random location with respect to the rotating cycle of the machine.

The above-described method is disclosed for example in the document U.S. Pat. No. 6,789,025 B2, in which the method is called the cyclic time average (CTA) method.

However, in connection with the present invention it has been noted that there are many elements of uncertainty in the act of applying the CTA method and other corresponding methods for monitoring the condition and operation of rotating objects, wherein the results of the analysis may be unreliable. The most significant risk relates to the fact that the methods are very sensitive even to small errors in the rotating speed information.

The effect of the error can be illustrated by means of the following simulated example, in which it is assumed that the object rotates at a rotating frequency of 10.0 Hz. The measurement signal consist of the basic frequency (1*RPM) at the rotating speed and two of its harmonic multiples ($3^{rd}$ multiple: 3*RPM and $8^{th}$ multiple 8*RPM). The signal of the object having the length of one rotating cycle (0.1 s) is shown in the circular set of coordinates in FIG. 2a. In the simulation white noise and other sequential signal components are summed up to the above-mentioned sequential signal. The power spectrum of the sum signal is shown in FIG. 2c and the time level sample of one second is shown in FIG. 2b. These describe by means of an example a measurement signal obtained of an object from the vibration sensor.

By means of the CTA method it is now possible to attempt to separate a signal component synchronizing with the rotating frequency of 10.0 Hz, wherein the result should comply with FIG. 2a. According to the method, the measurement signal is divided into consecutive sequences corresponding to the cycle time of the rotation, said sequences being averaged with each other. The result of averaging hundred cycles is shown in FIG. 2d simultaneously with the curve shown in FIG. 2a. As can be seen in FIG. 2d, the wave-form of the variations searched by means of the method is repeated and the effect of the noise and other harmonic components remains insignificant.

At the next stage the averaging is conducted as shown hereinabove in accordance with FIGS. 2a to 2d so that it is assumed that there are errors of different magnitude in the rotating speed information. In the situation of FIG. 2e, there is an error of 0.005 Hz in the rotating speed information, in FIG. 2f an error of 0.010 Hz, in FIG. 2g an error of 0.020 Hz and in FIG. 2h an error of 0.030 Hz. As FIGS. 2e to 2h show, even quite small errors in the speed of rotation cause a significant error in the average value. The reason for this is that the signal component to be searched is no longer summed at the same phase in the averaging, in other words each measurement starts for example in a different position of the rotating shaft, because the actual speed does not correspond to the measurement information obtained from the sensor or the control system. For example an error of two per mille (0.020 Hz) in the rotating speed information causes a phase shift of approximately 0.7 degrees in the rotating frequency component between each two successive sequences to be averaged. Thus, for example between the $1^{st}$ and the $100^{th}$ sequence there exists a phase difference of 70 degrees. For the higher multiples of the rotating frequency the error has an even stronger effect because the error in the length of the averaging cycle in relation to the cycle time of the frequency component is the larger the higher the frequency in question.

In addition to the uncertainty of the rotating speed information it should be noted that quite often the rotating speed varies during the measurement, wherein the length of the individual cycles to be averaged on the time level is not an invariable constant with respect to time. In the conventional STA method this is not disadvantageous because the length of each rotating cycle is measured separately with a synchronization pulse and the cycles of the measurement to be averaged always begin at the same point with respect to the rotating cycle, irrespective of the speed variation. In the above-presented cyclic time average method (CTA), it is not possible to monitor the variation in the length of the rotating cycle during the measurement.

Document FI 91919 B discloses a method in which the cyclic time average is calculated without the synchronization pulse. In the method the aim is to determine the periodical variations in the quality variables of paper and to recognize the machine means causing the variation. The averaging is performed as described above, but in this case several test frequencies are used for calculating the average value, said frequencies being located within the environment of the expected rotating frequency. In principle, results corresponding to FIGS. 2e to 2h are calculated, and the best one of them when compared to certain criteria is selected, said best result thus corresponding to the actual speed of rotation. Thus, by means of the method it is possible to calculate several results in the vicinity of a certain rotating frequency, by the same principle as presented in FIG. 2e to 2h, and to select the frequency that produces the best result on the basis of the set criteria. The method could in some cases solve the problem of the previous example that results from the inaccuracy in the rotating speed information. However, it would then be necessary to calculate the same analysis with quite a large group of different rotating frequencies, because for example in the case discussed hereinabove, the entire area to be examined should be covered in the environment of 10 Hz with a resolution of approximately 0.001 Hz. The analysis and comparison of the results also requires a great deal of work. Furthermore, the changes in the speed of rotation during the measurement still remain an unsolved problem.

SUMMARY OF THE INVENTION

The following provides a description of the method according to the invention for monitoring the condition and operation of periodically moving objects, by means of which method it is possible to calculate a result corresponding to the synchronized average without a synchronization pulse in such a manner that a slight inaccuracy in the rotating speed information or variation in the speed of rotation during the measurement does not affect the final result of the calculation and the analysis.

The method according to the invention is presented in claim 1. The system according to the invention is presented in claim 10.

In the calculation of a time average according to the invention, the aim is to pick up the signals synchronized with the rotation of the object from the measurement signal one cycle at a time and to eliminate the non-synchronizing components from the signal by averaging said cycles. The essential aspect of the invention is that frequency components synchronizing with the speed of rotation can be found in the signal itself, the frequency of said components also following the change in the speed of rotation. Thus, the found frequency component corresponds to the rotating frequency. It is possible to separate one of these frequency components from the measurement signal by means of signal processing, wherein it is possible to use said frequency component as a starting point for calculating the synchronized average.

The signal obtained from a separate synchronizing sensor has been replaced with a synchronizer or a synchronizing signal separated from the actual measurement signal. Said synchronizer or synchronizing signal indicates for example the rotating frequency of the rotating object and its phase.

It is a significant advantage of the method that for example small errors in the rotating frequency do not affect the final result of the averaging process, because the rotating speed information is only used as an approximate indicator on the basis of which the medium frequency of the filtering band used in the method is set. The method is also capable of adapting to the variation in the rotating speed during the measurement.

BRIEF DESCRIPTION OF THE DRAWINGS

In the following, the invention will be described by using an embodiment of the invention as an example, wherein reference is at the same time made to the appended drawings, in which.

DETAILED DESCRIPTION OF THE INVENTION

Figure 1A:
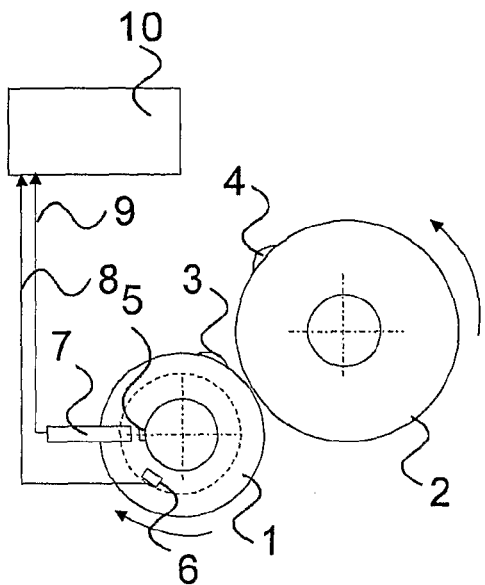
FIG. 1a to 1d show the principle and system of prior art for calculation of a synchronized time average.
Figure 1B:
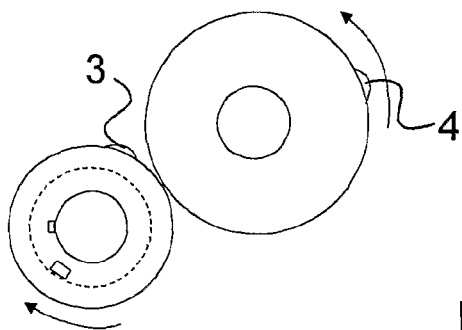
Figure 1C:
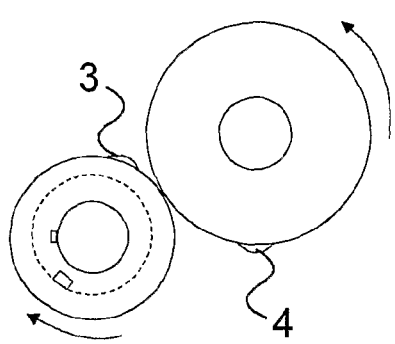
Figure 1D:
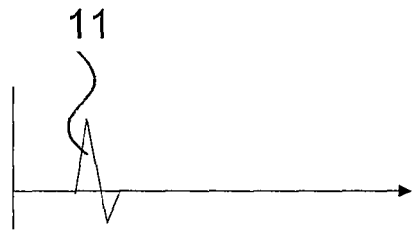
Figure 2A:
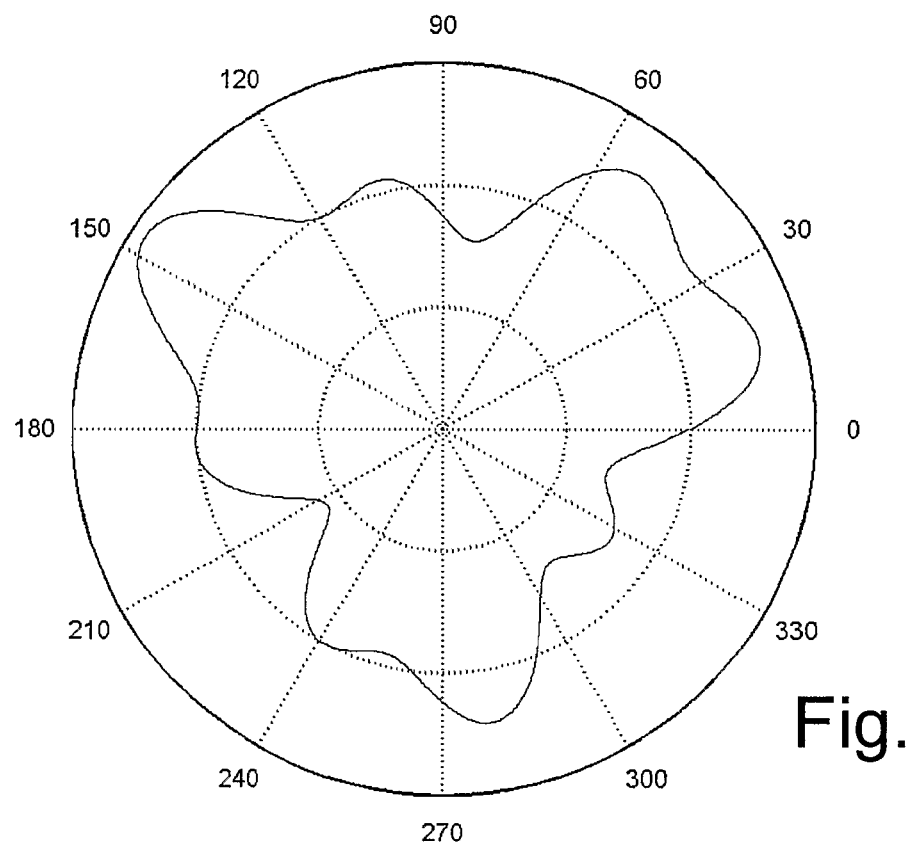
FIG. 2a to 2h show a second principle and system of prior art for calculation of a synchronized time average, and the effect of errors on the same.
Figure 2B:
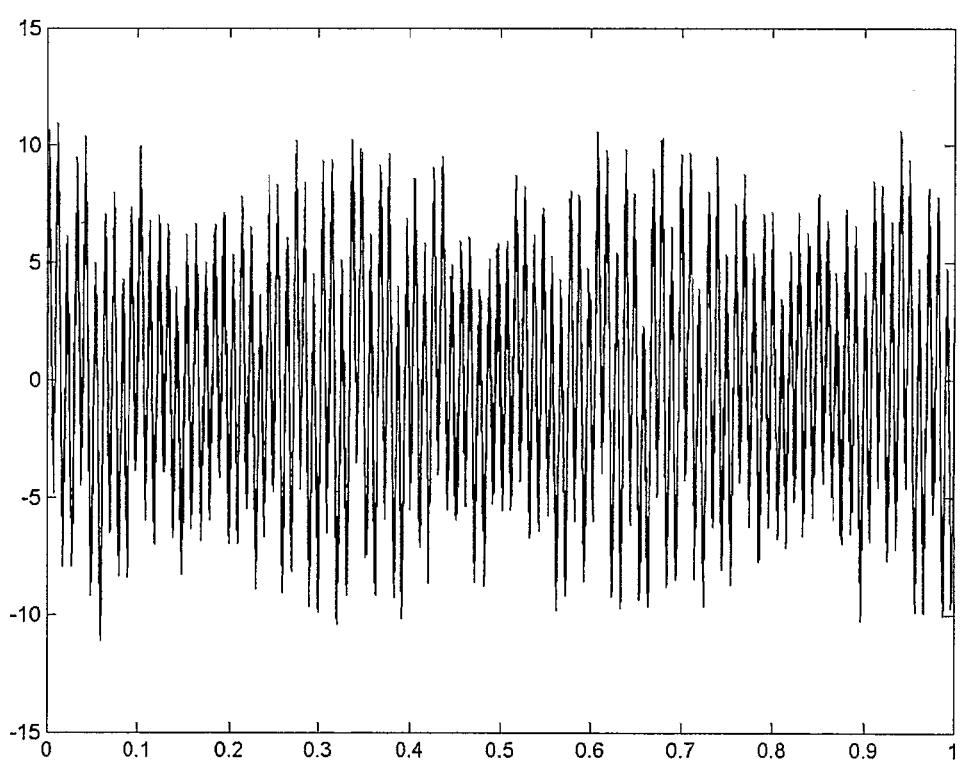
Figure 2C:
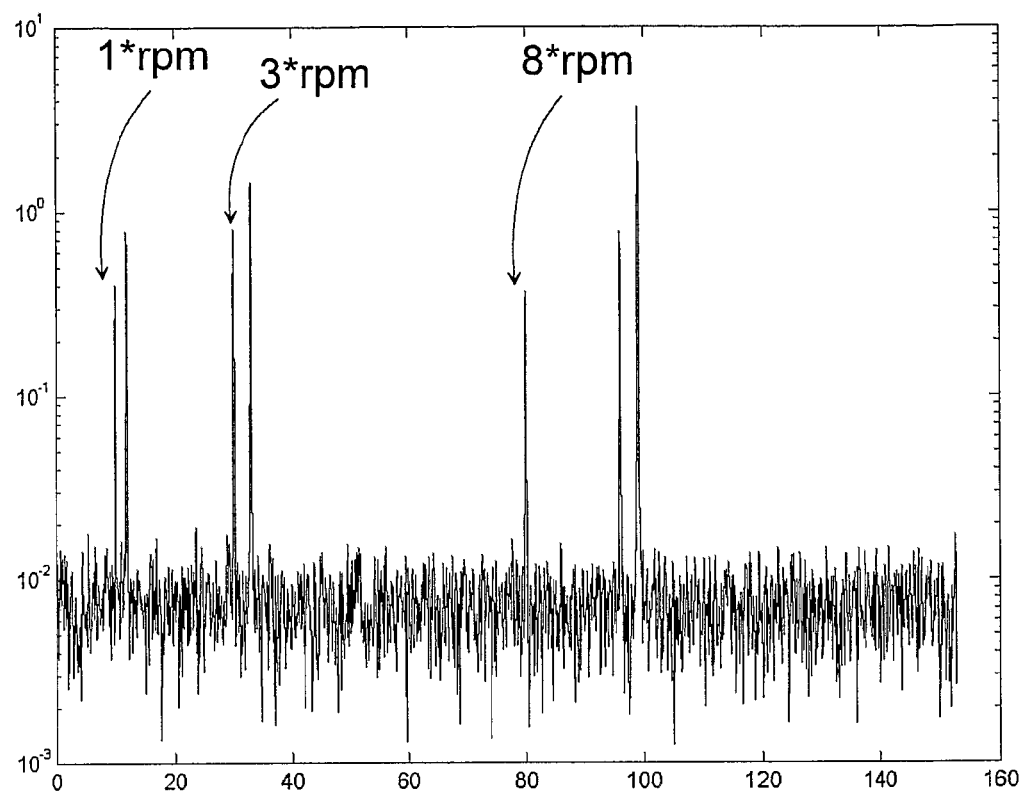

As an example it is also in this context possible to use the above-described case in which the rotating frequency and its $3^{rd}$ and $8^{th}$ multiple (N) can be detected from the spectrum of the measurement signal in accordance with FIG. 2c. When the approximate rotating frequency is known (for example in this case the frequency 10 Hz), it is possible to search for a spectrum peak from the spectrum of the measurement signal in the vicinity of said frequency (i.e. 10 Hz) or one of its multiples (N*10 Hz, i.e. 20 Hz, 30 Hz, 40 Hz, etc). When the spectrum peak is found, it is possible to separate said frequency component from the measurement signal for example by means of a narrow band pass filter, wherein the result obtained is a periodical measurement signal that follows the rotating frequency of the object in a frequency window determined by the band pass filter, said frequency window being determined by means of cut-off frequencies.

Figure 4:
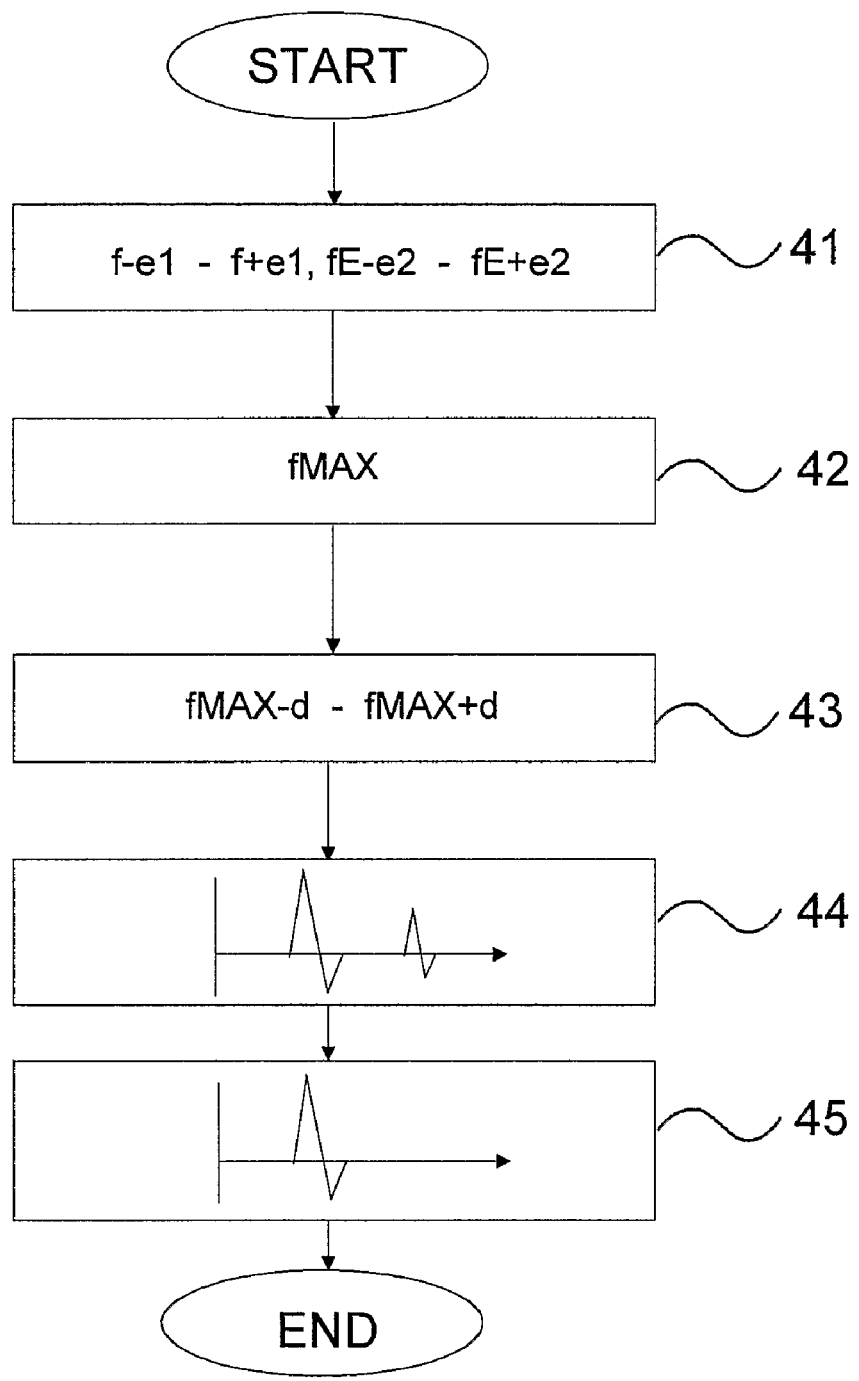

In the following the calculation of the synchronized time average is described in more detail with reference to the flowchart in FIG. 4 that illustrates the application of the method. This averaging can be carried out in the following way: In the first stage (step 41) the allowed variation $e_1$ for the rotating frequency f during the measurement (greatest allowed variation $f-e_1-f+e$ for the rotating frequency f) as well as the greatest error $e_2$ allowed for the given rotating frequency $f_E$ (greatest error allowed for the rotating frequency $f_E$ when compared to the actual rotating frequency f) is determined. The given rotating frequency $f_E$ is the estimated rotating frequency of the object or the frequency at which it should rotate.

In this description the rotating speed is used as an example, wherein the object to be measured is for example a roll or a shaft. However, the rotating frequency is only one example of a periodical operation typical for an object to be measured. The periodical movement is not necessarily always a rotating movement, and a piston compressor can be mentioned as an example. Possible objects are for example elements that run in the apparatus constantly, along a circular or alternating path. As an example it is possible to mention wires and felts moving in different kinds of machines and apparatuses, for which it is thus possible to determine an individual moving frequency or rotating frequency.

At the second stage (step 42) the highest spectrum, i.e. the strongest spectrum peak of the measurement signal and the frequency $f_{MAX}$ corresponding thereto is searched from the spectrum of the measurement signal, said frequency being available in the environment of said rotating frequency $f_E$ or its multiple, in the window ($f_E-e_2-f_E+e_2$) restricted by the error $e_2$, said frequency thus corresponding to the actual rotating frequency f at which the object is rotating.

At the third stage (step 43) the measurement signal is filtered with a narrow band pass filter, for example with a linear phase band pass filter, whose lower cut-off frequency is $f_{MAX}-d$ and the upper cut-off frequency $f_{MAX}+d$, in which representation $f_{MAX}$ is the medium frequency of the pass band corresponding to the rotating frequency found at the second stage or its multiple, and the frequency d restricts the pass band to the filter. For the filtering is also possible to use a filter with a non-linear phase response. The parameter d regulating the width of the pass band is set in such a manner that the limit $e_1$ set for the greatest variation allowed for the rotating frequency is realized. If $f_{MAX}$ corresponds to the rotating frequency, the correspondence $d=e_1$ is set. If $f_{MAX}$ corresponds to a multiple N of the rotating frequency, the correspondence $d=N*e_1$ is set. By means of setting the parameter d it is also possible to eliminate the effect of other strong frequency components in the environment of the frequency $f_{MAX}$ on the synchronizing signal. If there are other strong frequency components in the environment of the frequency $f_{MAX}$, it is advisable to set d so that the components remain on the stop band of the filter. By reducing the value of the parameter d it is thus possible to improve the reliability of the results, but at the same time the variation window allowed for the variations of the rotating frequency during the measurement is narrowed down.

At the fourth stage (step 44) the signal obtained at the previous stage is used in the averaging for synchronization by means of which it is possible to separate the different cycles of the measurement and to sum them up for the averaging. In accordance with prior art, the signal obtained from a separate synchronizing sensor was used for the synchronization.

Figure 2D:
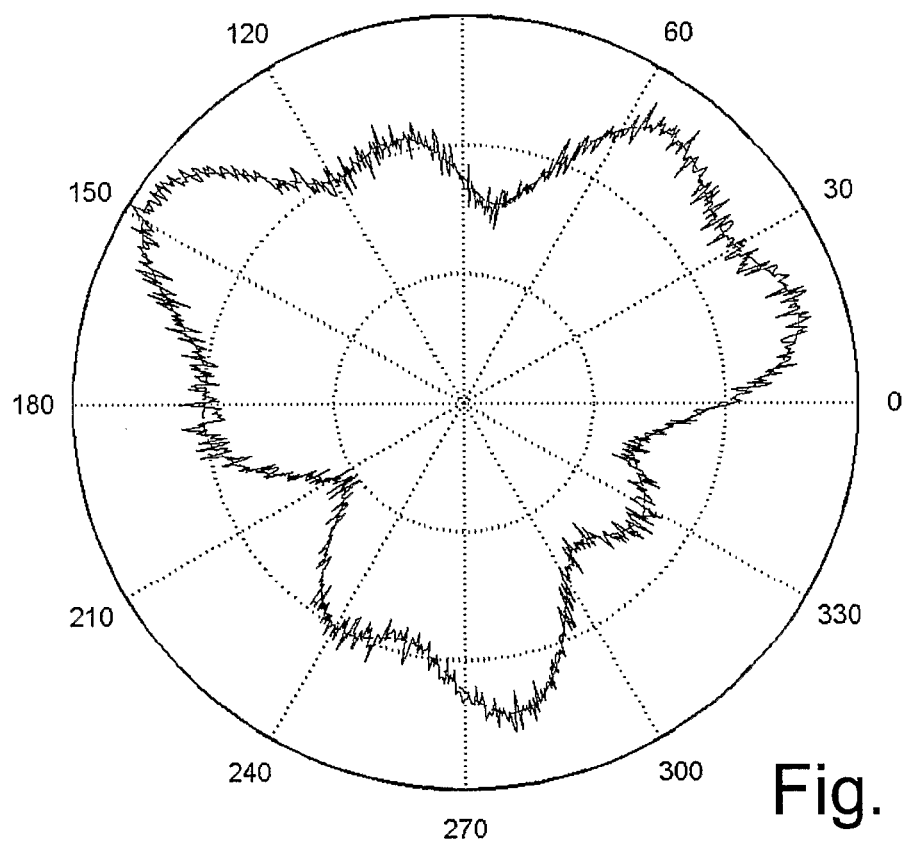
Figure 2E:
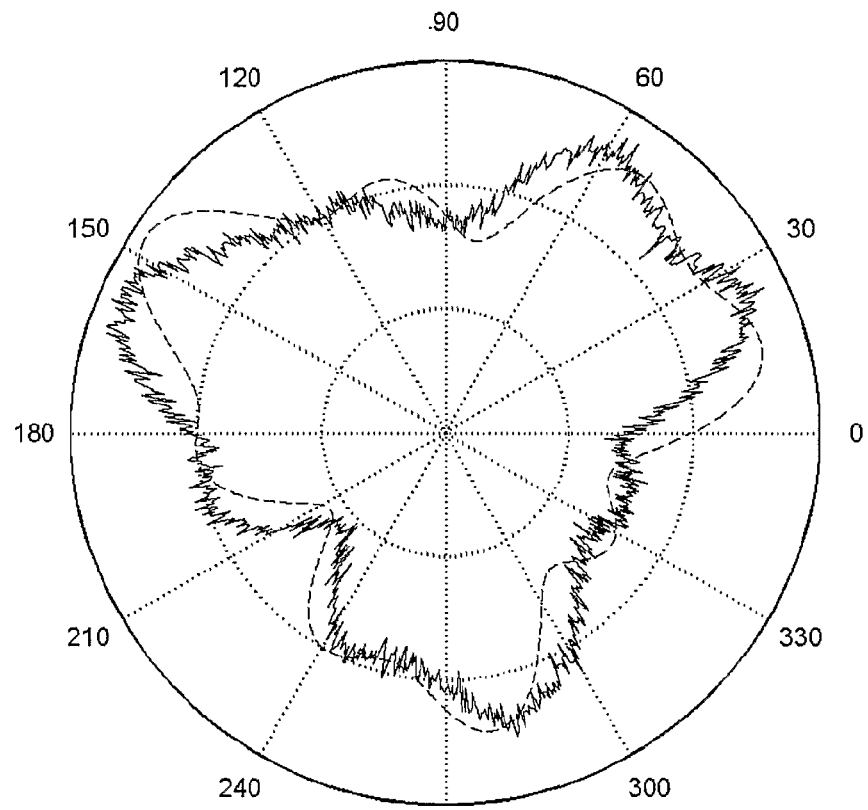
Figure 2F:
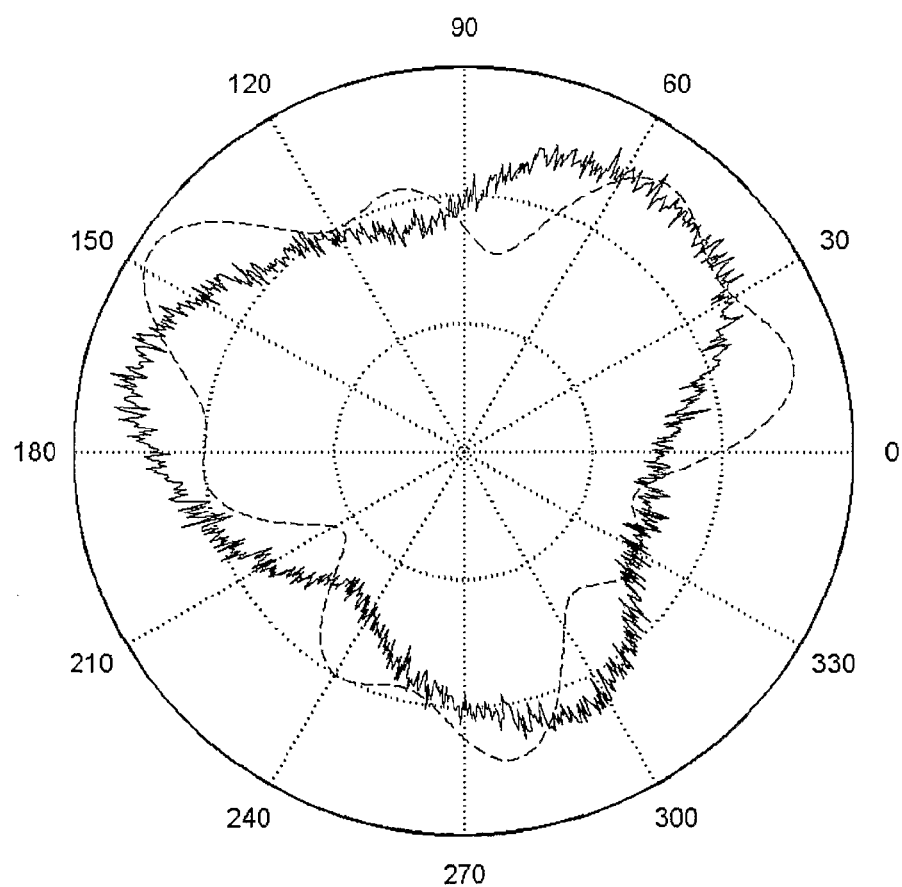
Figure 2G:
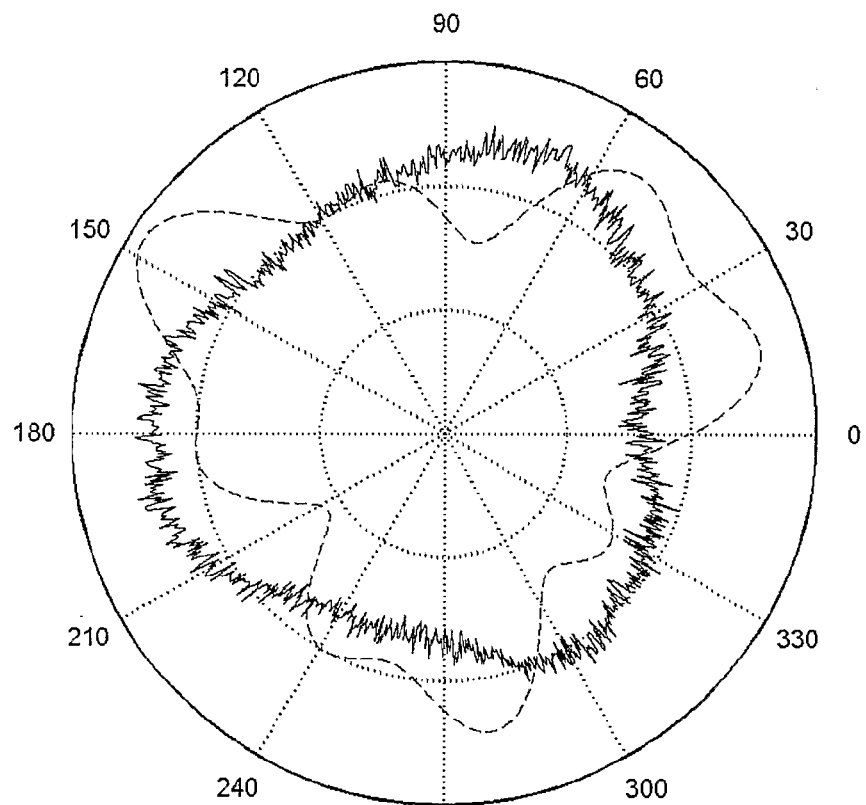
Figure 2H:
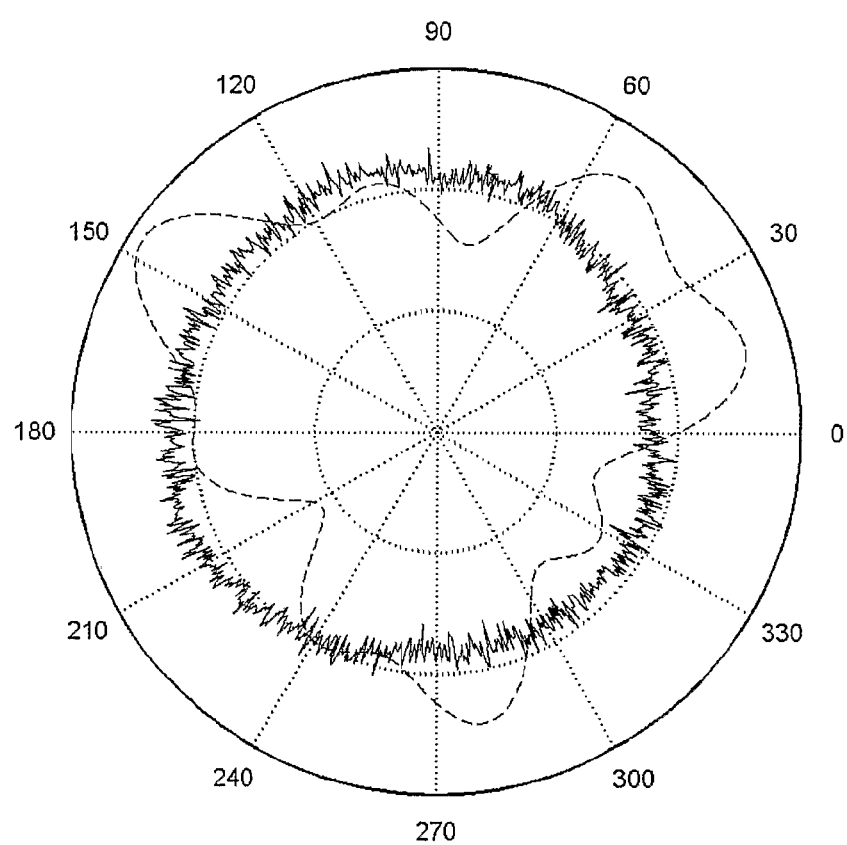

At the fifth stage (step 45), averaging is carried out as presented hereinabove, by dividing the signal to be measured for example into periods of time complying with the rotating cycle on the basis of a synchronizing signal determined at the previous stage, and periods of time are averaged with respect to each other. The results of the cycles of all the measurements are summed up and divided with the number of cycles, thus obtaining a synchronized time averaged signal as a result. The signal obtained as a result is then used in analyses in the desired manner, wherein for example a result corresponding to FIG. 2d is generated, said result being used for estimating the condition and operation of the machine.

Figure 3A:
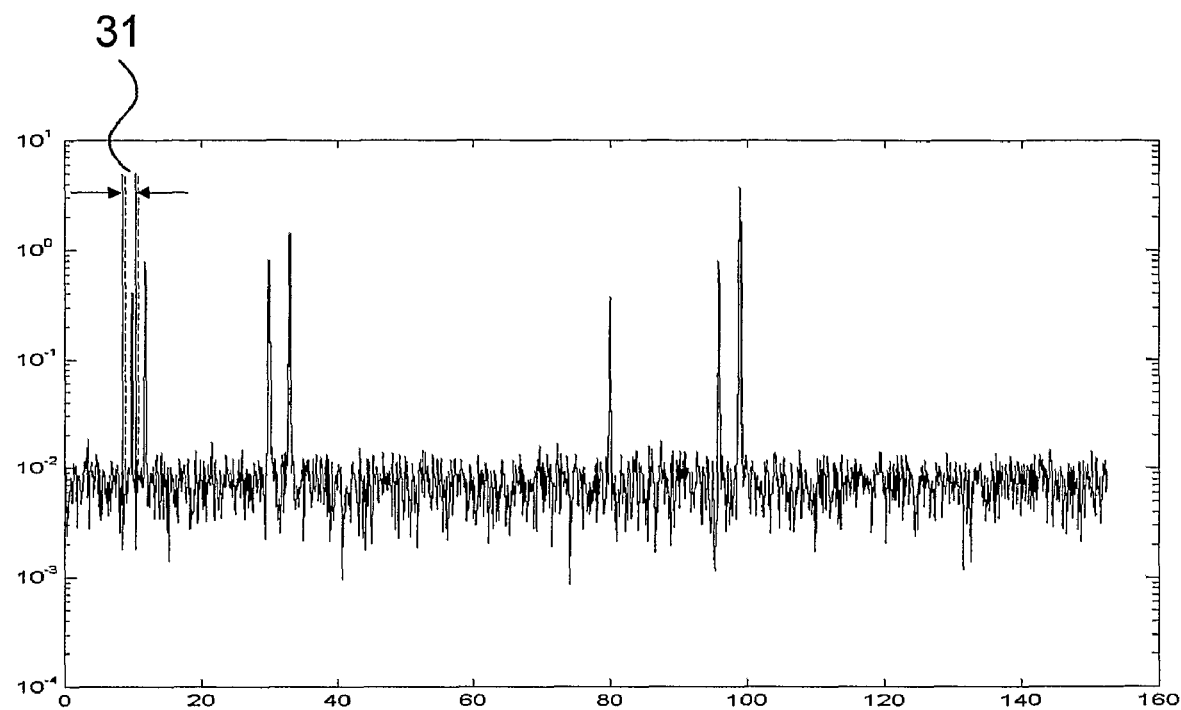
FIG. 3a to 3c show an example of calculating a synchronized time average according to the invention, and FIG. 4 show the method of calculating a synchronized time average according to the invention and the steps of the method in a flowchart.

The method has also been applied again to the earlier example and in the power spectrum of the sum signal of FIG. 2c so that the signal has been filtered with a narrow band pass filter ($f_{MAX}-d$ and $f_{MAX}+d$) in the environment ($f_{MAX}=10.0$ Hz, $d=0.5$ Hz) of the rotating frequency $f_{MAX}$ found in the spectrum of the signal in order to find the synchronizing signal. The obtained narrow band signal has been used as a synchronizing signal in the averaging. The frequency band 31 selected for the filtering is marked in FIG. 3a.

Figure 3B:
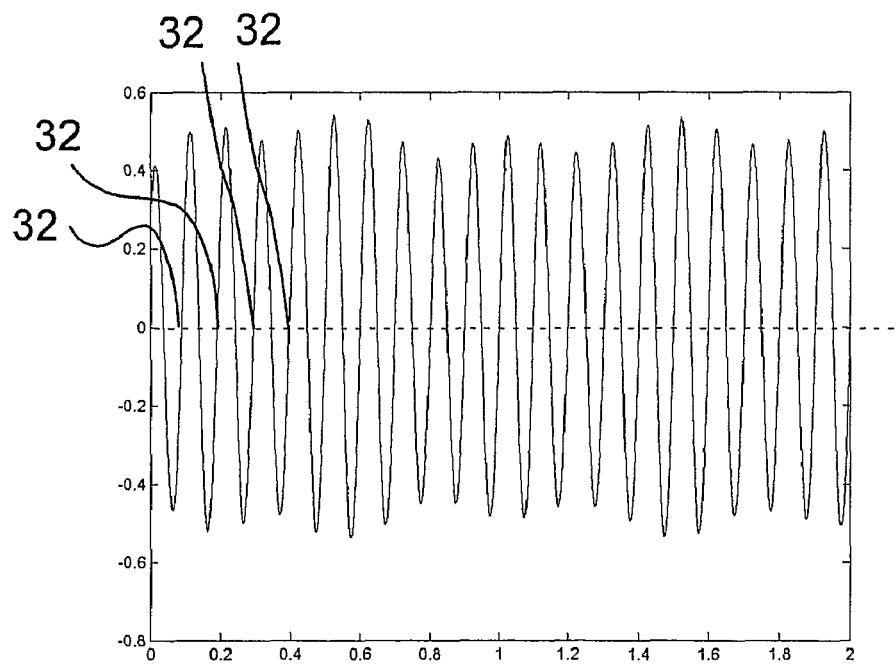
Figure 3C:
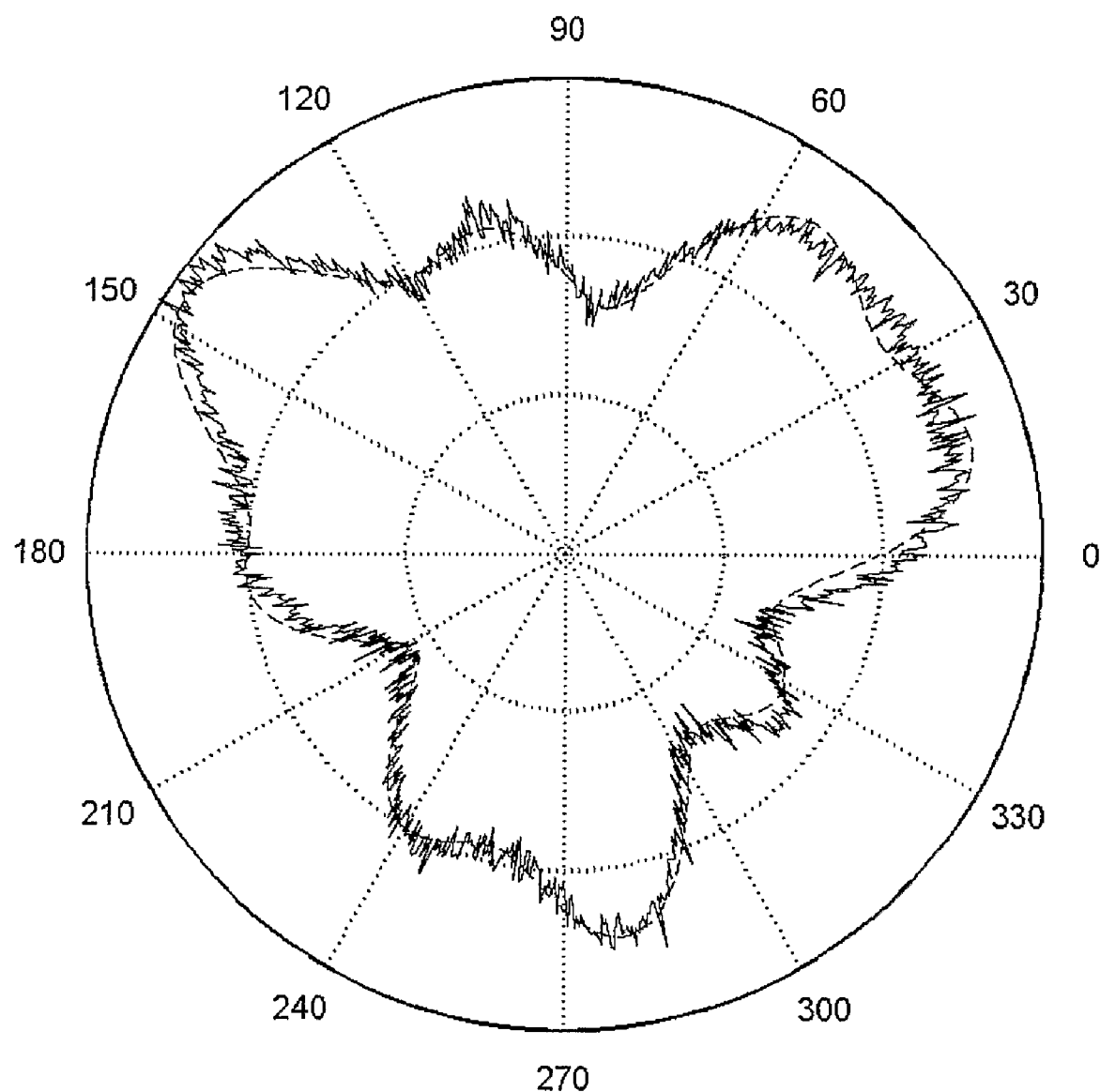

FIG. 3b shows a two second sample on the time level filtered from the obtained synchronizing signal. The synchronizing points used for determining the periods of the measurement can be searched from the synchronizing signal for example by thresholding the amplitude of the synchronizing signal on the basis of a desired threshold value (for example exceeding the value zero on the rising edge of the synchronizing signal, in FIG. 3b point 32). FIG. 3c shows the result obtained by means of averaging, said result being obtained by filtering the obtained measurement signal and determining the synchronization on the basis of the actual rotating speed. The synchronizing signal is obtained from the actual measurement signal in accordance with FIG. 3b. The results comply well with the corresponding results shown in FIG. 2d, which should also correspond to the initial situation shown in FIG. 2a, also marked in FIG. 3c.

Small errors in the rotating frequency do not affect the final result of the averaging process, because the rotating speed information is only used as an approximate indicator on the basis of which the medium frequency of the filtering band is set. The final length of the measuring cycle used in the averaging is determined on the basis of the frequency of the filtered measurement signal and the determined synchronizing signal. The method is also capable of adapting to the variation in the rotating speed during the measurement. For the operation it is of course necessary that the actual rotating speed falls within the selected filter band. Furthermore, to be able to apply the method, there must not be several strong spectrum components in the filtering window. However, in the above-mentioned situation it is possible to search for an alternative band within the environment of a harmonic multiple and to use a band restricted to the environment of this frequency to produce the synchronizing signal.

The invention is not limited solely to the examples presented above, but it may vary according to the appended claims. In the act of carrying out and implementing the method, it is possible to apply mathematic methods and measurement signal analyses in the analysing device, which are available for anyone skilled in the art to implement the method according to the above description. For the most part it is possible to utilize known measuring devices, methods and analysing devices applied for example in the implementation of the STA or CTA method.

The invention claimed is:

1. A method for monitoring the condition and operation of a periodically moving object, in which method a synchronized time average is calculated for a measurement signal that contains periodical variations and is obtained from the object response, the method comprising:
   determining a frequency response from the periodical variations of the measurement signal, said frequency response corresponding within predetermined limits to a frequency estimated as the periodicity characteristic to the object measurement,
   separating a signal component representing the determined frequency response from the measurement signal by filtering, and the filtered signal is used as a synchronizing signal,
   dividing the measurement signal into sequences by means of the synchronizing signal, and
   calculating the synchronized time average of the sequences.

2. The method according to claim 1, further comprising selecting a rotating frequency or a moving frequency of the object as the periodicity characteristic to the object.

3. The method according to claim 1 wherein the object is a roll or a shaft rotating in an apparatus.

4. The method according to claim 1 wherein the object is a wire or a felt running in an apparatus.

5. The method according to claim 1, further comprising:
   searching repeated synchronization points from the synchronizing signal for dividing the measurement signal into sequences, and
   dividing the measurement signal into sequences corresponding to the repeated synchronization points.

6. The method according to claim 1, wherein the determined frequency corresponds to the periodicity characteristic to the object or its multiple.

7. The method according to claim 1, further comprising separating the determined frequency response from the measurement signal by means of band pass filtering.

8. The method according to claim 1, wherein the determined frequency response corresponds to the frequency of the spectrum of the measurement signal having the largest amplitude within the frequency range under examination.

9. The method according to claim 1, further comprising generating the measurement signal by means of a vibration sensor for monitoring the condition of the object.

10. A system for monitoring the condition and operation of periodically moving objects, comprising:
    a sensor for generating a measurement signal obtained from the object to be measured, said measurement signal containing periodical variations, and
    an analysing apparatus for calculating a synchronized time average,
    wherein the analysing apparatus is configured to:
    1) determine from the periodical variations of the measurement signal a frequency response that corresponds within predetermined limits to a frequency estimated as the periodicity characteristic to the object measurement response,
    2) separate a signal component representing the determined frequency response from the measurement signal by filtering, and using the filtered signal as a synchronizing signal, and
    3) divide the measurement signal into sequences by means of the synchronizing signal, and to calculate the synchronized time average of the sequences.

11. The system according to claim 10, wherein the analysing device is further configured to
    4) search repeated synchronization points from the synchronizing signal for dividing the measurement signal into sequences, and
    5) divide the measurement signal into sequences corresponding to the repeated synchronization points.

12. The system according to claim 10, wherein the system comprises further comprising a band pass filter to separate the frequency response from the measurement signal.

13. The system according to claim 10, wherein further comprising a vibration sensor, which is connected to the system, that measures and monitors the condition of the object.

14. The system according to claim 10, wherein the object is a rolling object or a rotating shaft in an apparatus, or a wire or a running felt in an apparatus.

15. An analysing apparatus for monitoring the condition and operation of a periodically moving object, the analysing apparatus being configured to:

calculate a synchronized time average based on a measurement signal obtained from the object measurement, said measurement signal containing periodical variations, wherein the analysing apparatus is further configured to;

1) determine from the periodical variations of the measurement signal a frequency response that corresponds within predetermined limits to a frequency estimated as the periodicity characteristic to the object measurement,
2) separate a signal component representing the determined frequency response from the measurement signal by filtering, and using the filtered signal as a synchronizing signal, and
3) divide the measurement signal into sequences by means of the synchronizing signal, and to calculate the synchronized time average of the sequences.

16. The analysing apparatus according to claim 15, wherein the analysing device is further configured to:

4) search repeated synchronization points from the synchronizing signal for dividing the measurement signal into sequences, and
5) divide the measurement signal into sequences corresponding to the repeated synchronization points.

17. The analyzing apparatus according to claim 15, wherein the analysing apparatus further comprises band pass filtering to separate the frequency response of the object from the measurement signal.

18. The analysing apparatus according to claim 15, wherein the analysing apparatus is further configured to obtain said measurement signal from a vibration sensor.

19. The analysing apparatus according to claim 15, wherein the analysing apparatus is further configured to monitor a rolling object or a rotating shaft in an apparatus, or a wire or a running felt in an apparatus.

* * * * *